1

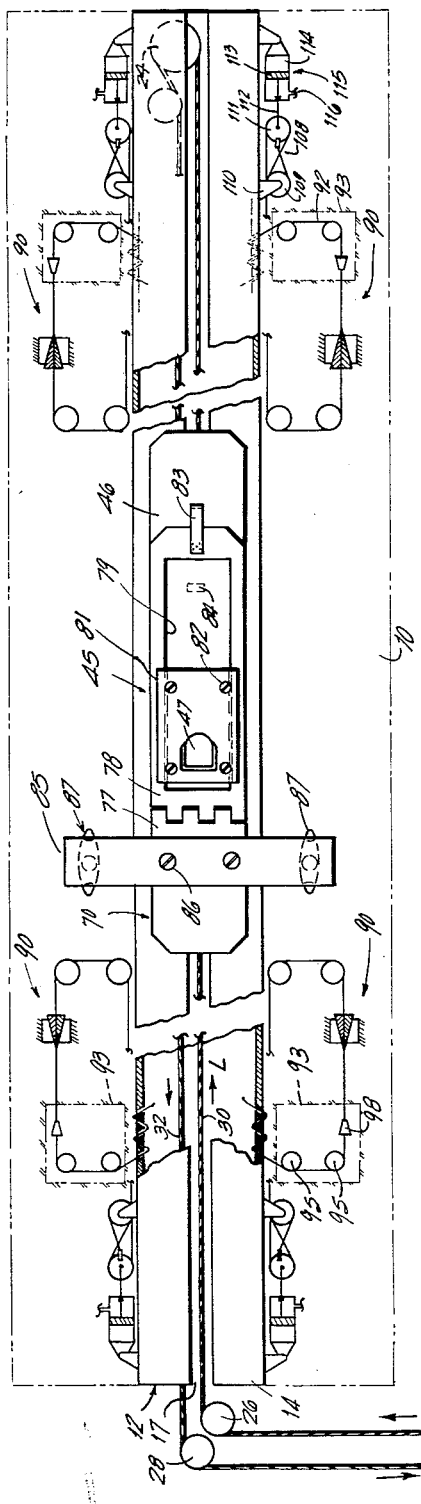

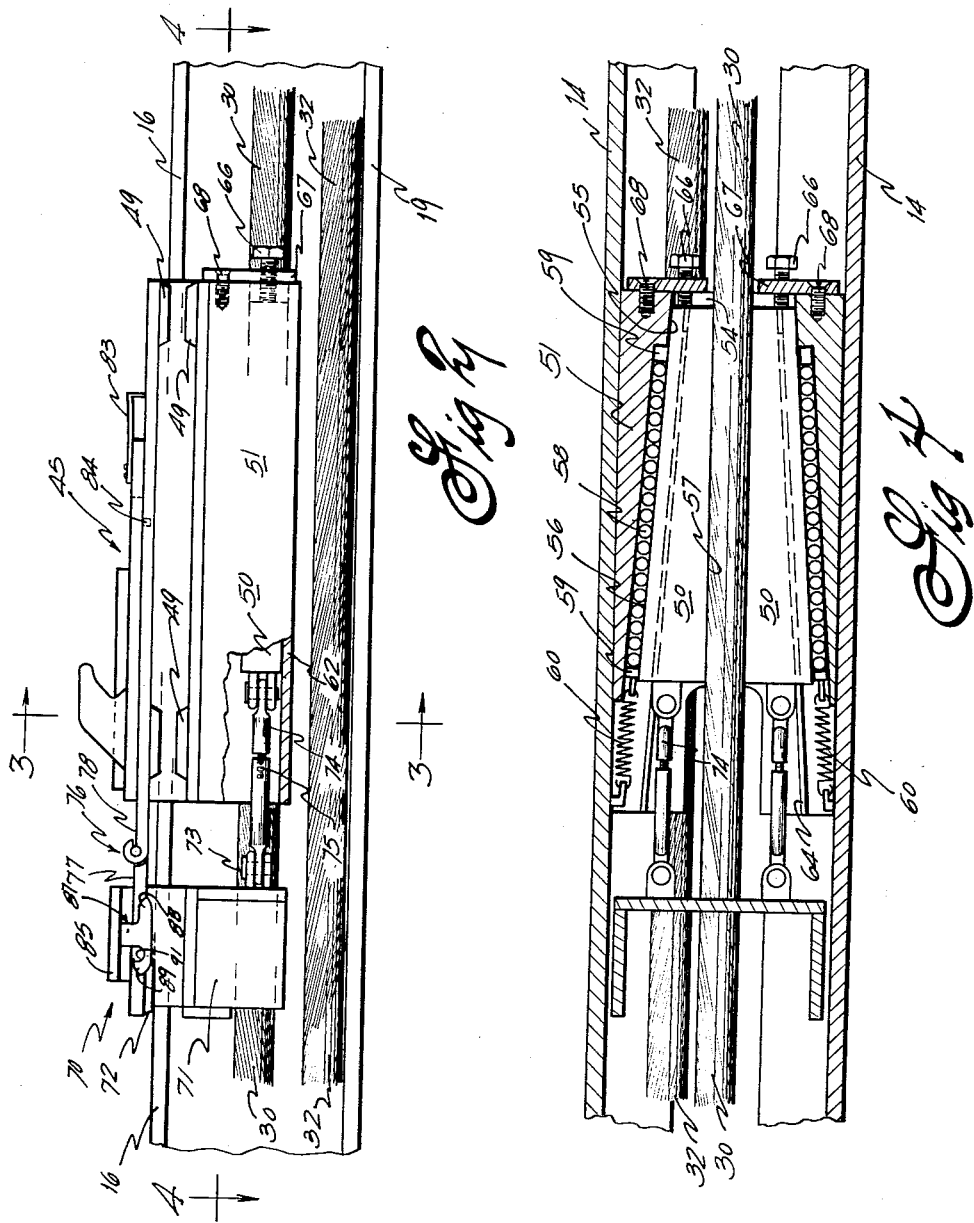

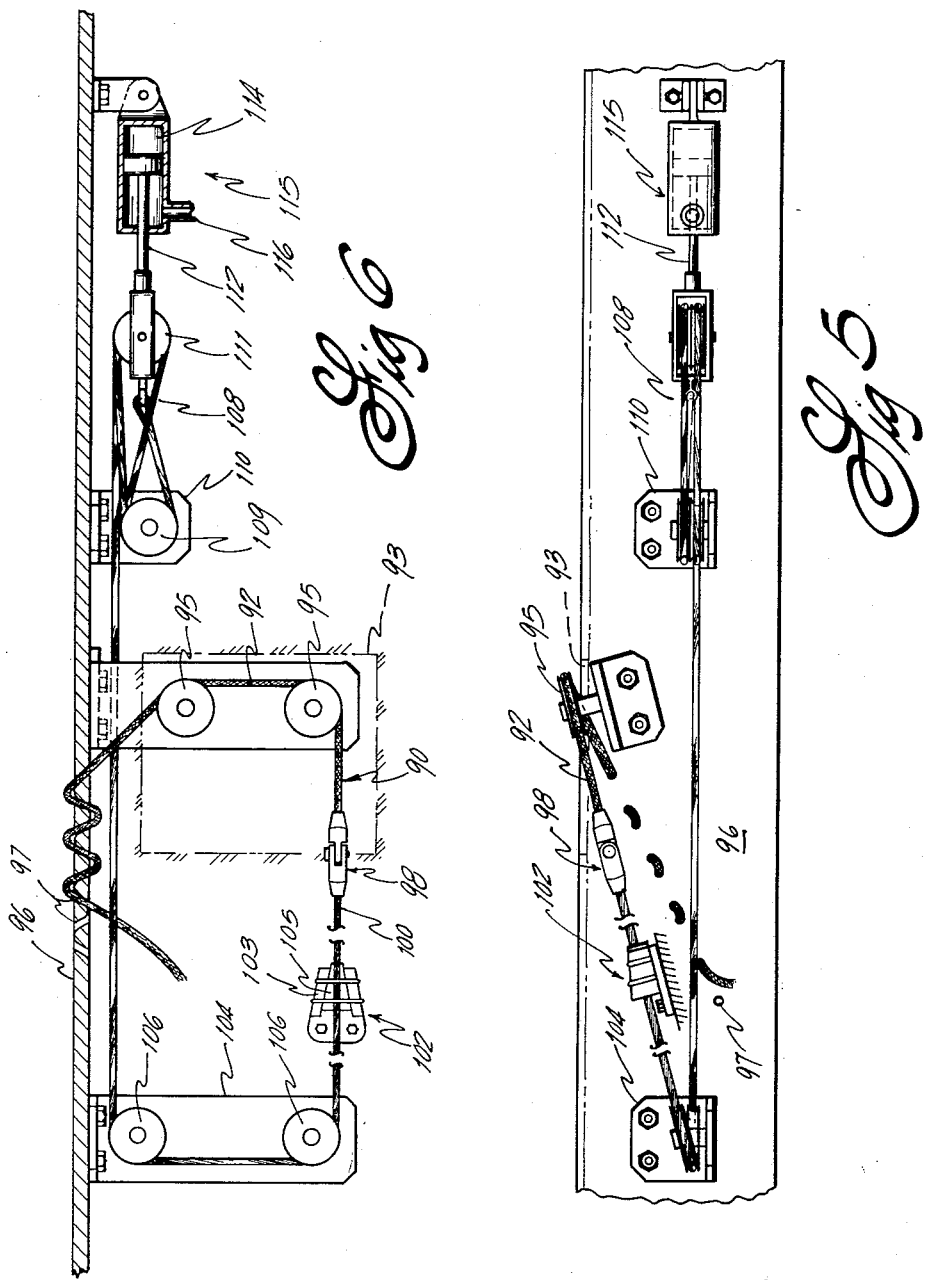

3,022,027
ENDLESS CABLE CAPSTAN DRIVE LAUNCHER
Sammie G. Keahey, Wilmington, Del., assignor, by mesne assignments, to the United States of America as represented by the Secretary of the Navy
Filed Sept. 28, 1960, Ser. No. 59,129
12 Claims. (Cl. 244—63)

This invention relates to aircraft launchers particularly adapted for use by an expeditionary force.

The usual means for providing an aircraft with an assist in take-off is a launcher located beneath the take-off surface. It has a longitudinally slotted cylinder in which a piston is propelled under a force, as by the expansion of steam. An arm joined to the piston and projecting through the slot transmits the force of the piston to the aircraft by a shuttle to which both are connected.

A device of this nature is not feasible for use on an expeditionary field because of its weight, size and general unwieldiness. Furthermore, the installation time consumed in the preparation of the site, and the perfection with which it must be installed to be reasonably operable are too excessive for a temporary adventure.

As a consequence, it is an object of this invention to provide a rugged launcher which is relatively light in weight and readily installed to adapt it for field use.

Another aim of this invention is to provide a bi-directional launcher employing a shuttle powered by an endless cable having advance and return reaches driven from a friction spool whereby launching is possible from either cable reach without need of reversing the power supplied to the cable.

Further, it is an object to provide a cable-type launcher with a new and improved shuttle which is readily attached and detached from the cable, and with a novel shuttle arresting and retrieving means in which energy absorbed in braking the shuttle is utilized to return it to its starting position.

Various other objects and advantages will be apparent from the following description of one embodiment of the invention when read in conjunction with the accompanying drawing in which, FIG. 1 is a plan view of the launcher with some parts of it broken away and others shown schematically;

FIG. 2 is a side elevation of the shuttle and arrester engager;

FIG. 3 is a transverse, sectional elevation of the mechanism shown in FIG. 2, as viewed from the line 3—3;

FIG. 4 is a longitudinal section as viewed from the line 4—4 of FIG. 3;

FIG. 5 is an enlarged plan view of shuttle arrester; and

FIG. 6 is an enlarged view of the arrester shown as seen in elevation from its outer side.

In the illustrated embodiment of the invention, the numeral 10 (FIG. 1) designates an aircraft take-off surface having a shuttle track 12 formed by a pair of parallel channel members 14 and 14, that extend along the line of launch. The channel members are sunk into the take-off surface so that the upper flanges 16 and 16 (FIG. 3), of the channels are at surface level and directed toward each other, but are separated to define a longitudinal slot 17. Pickets 18, FIG. 3, in the lower flanges 19 and 19 secure the channels to the surface 10.

An endless cable 20, again referring to FIG. 1, is wound with two or three turns around a capstan 22 located to one side at the aft end of the track 12 and looped over a fixed sheave 24 mounted at the track's forward end. It passes over fixed sheaves 26 and 28 at the aft end of the track and forms an advance reach 30 and a parallel return reach 32 that travel in an endless manner between the channels 14 and 14 under the upper flanges 16 and 16. Sheaves, 33, are appropriately positioned for alignment of the cable and additionally, the portion of the cable in the advance reach between the fixed sheave 26 at the aft end of the track and the capstan 22 is passed over two fixed sheaves 34 and 34 and a movable sheave 36 disposed between them. A rod 37 connects the movable sheave 36 to a piston 38 in a fixed cylinder 39 of cable tensioner 40. Pressure, supplied from an accumulator 42 by a conduit 41 connected to the cylinder 39 urges the movable sheave 36 outwardly and against sheaves 34 and 34 to thereby remove cable slack and maintain it under a pre-set tautness as determined by the pressure of the fluid within the accumulator 42.

The capstan 22 is journaled to rotate in standards 42 and 42 under power supplied from a suitable source as the engine 43 shown for the purpose. The use of the capstan 22 permits continuous driving of the cable. It is a friction spool cable drive device with a concave surface the profile of which is shaped so that, as the cable wraps around it, longitudinal or circumferential slippage is induced to prevent the cable from progressing axially off the capstan, as it would on a cylindrical drum. A parabolic shape (in half section) provides the surface with the proper slope for driving the capstan at various speeds and tensions. This surface shape is such that during stable operation the cable wraps under steady torque at a constant rate in the axial direction. At it wraps toward an axial end of the capstan, the increasing steepness of the slope causes it to slip longitudinally toward the center and maintain the cable at one position. If the torque is suddenly increased at a rate greater than can be accommodated by the rate of advance of the cable helix on the capstan, circumferential slippage is induced. The circumferential slippage reduces the ability of the cable to advance along the capstan, or conversely, reduces the force maintaining it in its particular position on the slope of the capstan, and the wraps of the cable slide back down from the steep portion of the capstan slope with a snap. The condition of static friction in the circumferential direction is immediately restored. The cable creeps back up the capstan to its stable position or the circumferential slip cycle is again repeated if the rate of torque advance is still too great.

Power from the cable 20 is transmitted to a shuttle 45 mounted on track 12 for reciprocable movement therealong. The shuttle includes a shuttle body 46 from which extends the usual shuttle hook 47 and by which the aircraft to be launched is coupled as by a bridle or other means, not shown. The shuttle body 46 (FIG. 3) is I-shaped in cross-section having longitudinal side grooves 48 and 48 into which are fitted the edges of channel flanges 16 and 16 for guiding the shuttle in its travel along the track. Shoes, 49 and 49, are secured to the upper and lower walls defining the side grooves 48 and 48 for protecting the shuttle body from wear.

The shuttle 45 is detachably coupled to the cable 20, FIG. 3, by a pair of opposed wedges 50 and 50 which grip the cable at its sides between them. In the drawing, the shuttle 45 is shown secured to the advance reach 30 of the cable 20 for launching from left to right as shown by the arrow marked L. For launching in the opposite direction, the shuttle is turned around and secured to the return reach 32 of the cable. The wedges 50 and 50 are movably mounted in a housing 51 of a cable clamping assembly 52 that is secured by screws 53 to the underside of the shuttle body 46 and disposed between the channels 14 and 14. The housing 51, FIG. 4, is a rectangular piece of metal and has a groove 54 in its bottom surface which opens at the ends. The side walls, 55 and 55, of groove 54 converge in a forward direction and mate with the converging outer side walls, 56 and 56, of wedges 50 and 50 in order that movement of the wedges relative the housing in a forward launching direction, will diminish the distance they are apart and thereby exert a clutching effect on the cable; whereas, rearward movement will increase the distance and disengage the cable from the shuttle. The rearward movement increases the distance between wedges to allow the launch cable to drop from the cable clamping assembly to facilitate the free motion of the assembly during its arrestment and return to the battery position. The inner sides 57 and 57 of the wedges are semicircularly shaped to conform to the cable's outer surface.

Free movement of the wedges 50 and 50 relative the housing 51 is enhanced by rollers 58 positioned between them. The rollers 58 are mounted in a rectangular frame 59 which is normally biased rearward by tension spring 60 attached at one end to the frame and at the other to the housing 51 by bolts 61.

Plates, 62 and 62, are secured by bolts 63 in the bottom of housing 51; there is one on each side of the groove for each wedge and each has a portion that extends under the wedges for its support.

Over-clamping of the cable by wedges 50 and 50 is prevented by stop bolts 66, FIG. 4, threaded through an end plate 67 which in turn is secured by screws 68 to the forward end of housing 51. The wedges, in their full clamped position, abut the bolt ends. The degree of clamping by the wedges obviously may be varied by threading the bolts 66 into or out of the plate 67.

Wedges 50 and 50 are moved forward into clamping action by motion of the cable with which there is frictional engagement. Removing plates 62 and 62 permits removal of wedges 50 and 50 from housing 51, freeing the cable from its travel between the wedges, and, thus, upon re-assembly the other reach of the cable may be coupled to the shuttle, if so desired.

Longitudinal ridges 64 and 64, extending parallel to the line of shuttle travel, project upward from plates 62 and 62 into grooves 65 and 65 formed in the bottom of wedges 50 and 50 to provide guides for them.

Retraction of wedges 50 and 50, and thus disengagement of shuttle 45 from the cable, is achieved with arrestment of the shuttle. For this purpose, the shuttle tows behind it an arrester engager 70, FIG. 2, which is capable of longitudinal movement relative the shuttle 45 and which is moved rearward, to thus disengage the wedges to which it is coupled, on contact with pendant type shuttle arresters, 90 (FIG. 1), located at the ends of the launch track.

The arrester engager 70 (FIG. 2) has a body 71 similar to that of the shuttle 45 in that it has side grooves fitted with shoes 72 and 72, for receiving the flanges 16 and 16 of the track 12 and thereby guiding the engager along the track. The forward end portion of the body 71 that is disposed beneath the flanges, 16 and 16, is bifurcated and pivotably secured by a pin 73 to the rearward ends of links 74 and 74. Each of the wedges, 50 and 50, is similarly bifurcated and has the forward end of a link 74 pivotably secured thereto. The links, as shown, are two part members with the parts joined by threads 75 in order that the link length may be varied.

The portions of the arrester engager 70 and shuttle 45 that are above the take-off surface are joined by a hinge 76 of which a leaf 77 is secured, by welds or otherwise, to the top of the engager body 71; the other or forward hinge leaf 78 has a rectangular mortise 79 (FIG. 1) and is looped over the shuttle hook 47 which protrudes therethrough. The mortise is longer than the hook's base length within it to permit restricted sliding, horizontal travel of the leaf 78 and the engager thereby, relative the shuttle. A retainer plate 81 fastened by screws 82 to the hook 47 prevents vertical movement of the leaf and its disengagement from the shuttle.

In order to lock the wedges in an open position, that is to keep them separated and permit the cable to pass freely between, as is desirable during detachment of the shuttle from the cable, a spring biased stop lug 83 is provided on hinge leaf 78 which is adapted to enter a hole 84 in the top of the shuttle body 46 upon sliding the hinge 76 to its full rearward position. At this time the wedges are also full back and at their maximum open position. Prying the stop 83 out of the hole 84 allows the hinge to be slid forward so that the wedges will clamp the cable.

A cross bar 85 is secured by screws 86, or other means, to the top of the rearward hinge leaf 77 and is provided at the underside of its ends with double hooks, 87 and 87. Each double hook, 87, includes a forwardly and a rearwardly inclined hook, 88 and 89, respectively, integrally connected at their backs by which an arresting pendant 92 may be picked up by one or the other regardless of the direction of shuttle travel. The rearward hook, 89, is also notched near its heel, as at 91, for retaining engagement with an arresting pendant 92 and restraining the shuttle from reversing its direction under a rebounding force.

Situated beneath the landing surface 10, to the side of and at the terminals of the track 12, is a shuttle arrester, designated generally at 90, having the arresting pendant 92 protruding through an opening 93 in the landing surface. The arresting portion of the pendant extends between two pulleys 95 and 95 on a line perpendicular to shuttle travel and is supported at sufficient height for engagement by a hook on the engager cross bar 85. The pendant is an elastic rope, preferably of nylon, secured at one end to the web 96 of a track channel (FIG. 6), as by the cinch made through web holes, 97. The other end of the rope is connected by a double socket coupler 98 to the end of a cable 100. The cable 100 is releasably held in an anchor 102 to resist forces applied to the pendant or rope 92 and to permit a pull on the cable rearward of the anchor to draw the rope towards the anchor as is required for maintaining the pendant taut.

The anchor 102 has a housing 103 secured to a track channel by a bracket 104 in which there are a pair of cable clamping wedges 105. Forward movement of the wedges, incurred with motion of the rope undergoing arrestment of the shuttle, increases clamping action; whereas, rearward motion, as from a pull on the cable rearward of the anchor by the tensioner, releases them.

The cable 100 is directed over sheaves 106 and 106 to a gun tackle 108 to which its other end is secured. The fixed pulley 109 of the tackle 108 is attached by a bracket 110 to a track channel, and its movable pulley 111 is connected by a rod 112 to a piston 113 in a cylinder 114 of a cylinder-piston type pendant tensioner 115. A conduit 116 connects the cylinder 114 to a pressure tank or accumulator (not shown) from which a fluid force is applied to the piston causing it to move outwardly; in doing so, it takes up slack in the arresting system and maintains the pendant under a predetermined tension.

In use of the mechanism, the shuttle 45, with its wedges 50 and 50 at full open and stop lug 83 engaged in hole 84, is positioned at the rearward end of the track and the arrester pendants 92 at that end are coupled in the notches of the indented hooks 89 on the arrester engager. An aircraft is parked over the shuttle and connected by a bridle or other suitable means to the shuttle hook 47. The launching cable 20 is lifted into position to be gripped by the wedges by hydraulic cylinders (not shown). An additional cylinder (not shown) moves forward prying lug 83 from hole 84, and the pendants 92 disconnected from hooks 89. The cylinder continues to move the wedges forward until they grip the cable. Friction between the wedges and the cable as it begins to move causes the wedges to move forward in a self-energizing manner and grip the cable tighter, the shuttle and aircraft is thereby thrust forward as the engine 93 energizes the cable.

In FIG. 1 reach 30 is shown gripped by the wedges of the shuttle passing directly in the track slot, whereas cable reach 32 is shown to the side of the slot. It should be appreciated that the shuttle may be connected to either of the reaches, 30 or 32, and that they normally assume the position shown by reach 32 in FIG. 3, that is, they lie side by side on the bottom of the chamber between channels 14 and 14. However, since they are flexible members, cables, either of them can be lifted vertically into the wedges of the shuttle. When a cable reach is so connected by the wedges, then, as the shuttle moves in a given direction along the track, it lifts a portion of the reach ahead of it; whereas the portion of the reach behind it tends to fall back into the chamber between the channels, i.e., into a position similar to that shown by reach 32 in FIG. 3.

At the end of the launch, forward hooks 88 of the arrester engager pick up the forward pendants. The shuttle energy is absorbed by elongating the pendants, and by this action the arrester engager is moved rearward respective the shuttle. This detaches the wedges 50 from the cable 20, since they are likewise retracted. The retraction is sufficient to permit lug 83 to drop in hole 84, and thus the wedges are held open. The stretched pendants, due to their elasticity, sling the shuttle rearward, or cause it to rebound, which is now free to move relative the cable, since the wedges are locked at full-open, whereupon the rearward arresting pendants are picked up by the rearward arrester engager hook 79.

Although the rearward pendants are also elastic, re-returning of the shuttle forwardly is prevented by the pendants catching in the notches 91 of the hook 79.

From the foregoing, it is apparent that an efficient and effective launcher has been devised for expeditionary use in which a novel shuttle and shuttle retrieving mechanism are employed.

Obviously the invention is not limited to the single embodiment described, nor otherwise except as defined in the following claims.

What is claimed is:

1. In an aircraft launching apparatus, a longitudinally extending launching track having rearward and forward ends, a shuttle assembly mounted for reciprocable movement in said track, means in said track for propelling said shuttle assembly from the rearward to the forward ends of said track, and a resilient arrester means mounted at the forward end of said track adapted to be engaged by said shuttle assembly to thereby halt its forward movement and cause it to rebound to the rearward end of said track.

2. In an aircraft launching apparatus, a launching track having rearward and forward terminals, a power driven inextensible, flexible member disposed for travel along the length of said track, a shuttle assembly mounted for reciprocable movement in said track, releasable clamping means being included in said shuttle assembly adapted to clutch said flexible member for forward movement of said shuttle assembly with said flexible member, and a resilient shuttle arrester means disposed at the forward terminal of said track adapted to be engaged by said shuttle assembly for halting forward movement thereof, causing said clamping means to disengage said flexible member and said shuttle assembly to rebound to the rearward terminal of said track.

3. The apparatus of claim 2 including means at the forward terminal of said track for catching a rebounded shuttle assembly and retaining it thereat.

4. A bi-directional aircraft launching apparatus comprising a longitudinally extending launching track, an elongated inextensible, flexible member having a pair of reaches disposed for simultaneous opposite travel along said track, power means connected to said flexible member for applying motion thereto, a shuttle mounted for reciprocal movement in said track including clamp means for releasably securing said shuttle to either of said reaches of said flexible member, an arresting means disposed at the end-of-launch terminal of said track for halting forward motion of said shuttle, and an arrester engager connected to said clamp means adapted to engage said arresting means for halting said shuttle and to thereby actuate said clamp means to release said flexible member.

5. In a launching apparatus, a longitudinally extending track, a shuttle mounted for reciprocable movement in said track, a power driven elongated, inextensible, flexible member disposed for travel along said track, clamp means connected to said shuttle for movement therewith and straddling said cable, said clamp means having wedges capable of restricted longitudinal movement relative said shuttle and adapted to grip said flexible member under forward motion thereof and release said member with movement opposite that of said flexible member, a shuttle arrester disposed at the end-of-launch terminal of said track, and an arrester engager means connected to said shuttle and said wedge means, said engager having restricted relative longitudinal movement relative said shuttle and adapted to engage said shuttle arrester so that said shuttle will be halted and said clamp means will release said flexible member.

6. In an aircraft launching apparatus, a longitudinal track, a shuttle reciprocably mounted on said track and adapted for coupling to an aircraft, a sheave disposed at one end of said track and a capstan disposed at the other end thereof, an endless cable reeved between said sheave and capstan having advance and return reaches for travel along said track, power means for rotating said capstan and cable thereby, and clamping means mounted on said shuttle for releasably gripping a reach of said cable.

7. The apparatus of claim 6 wherein a half profile of the outer surface of said capstan is parabolic.

8. The apparatus of claim 7 including tension means for maintaining said cable under a predetermined tension.

9. An aircraft launcher comprising a track including a pair of parallel channels having spaced apart inwardly directed flanges, a sheave disposed at one end of said track and a capstan at the other end thereof, an endless cable reeved between said sheave and capstan having advance and return reaches passing between said channels, a hydraulic tensioning means for prestressing said cable, a shuttle reciprocably mounted on said track having longitudinal side grooves adapted to receive said flanges for guiding said shuttle thereby, clamping means including a housing secured to the underside of said shuttle and wedges therein adapted to move from open to closed position, said clamp means adapted to straddle a reach of said cable between said wedges, a shuttle arresting means disposed at each end of said track including a prestressed resilient rope, an arrester engager connected to said wedges and said shuttle capable of restricted longitudinal movement therewith so that rearward movement of said engager relative said shuttle will move said wedges to their open position, and hook means including inclined forward and rearward hooks mounted on said engager for picking up said resilient rope, said rearward hook being notched for retaining engagement of said hook with said rope.

10. The launcher of claim 9 including an aperture in the surface of said shuttle and a spring biased stop lug on said arrester engager adapted to enter said aperture with movement of said wedges to their full open position thereby preventing closing of said wedges.

11. In an aircraft shuttle to be propelled by a power driven cable and arrested upon contact with a fixed object, cable clamp means for releasably attaching said shuttle to said cable comprising a housing secured to said shuttle having a longitudinal groove, spaced apart wedge shoes reciprocably mounted in said groove adapted to receive said cable between them and grip it with forward movement relative thereof and release it with opposite movement, an arrester engager for halting said shuttle on contact with said fixed object, said arrester engager being coupled to said shuttle for restricted relative longitudinal movement therewith, and link means connecting said wedges to said arrester engager for movement therewith.

12. An energy absorber comprising a pair of fixed, spaced sheaves, a flexible resilient elongated member reeved over said sheaves defining a span therebetween, fixed means, an end of said elongated member secured thereto, a flexible non-extensible elongated member, the other end of said resilient elongated member secured to one end of said non-extensible elongated member, a fixed anchor, clamping means in said anchor, said non-resilient elongated member being held in said clamping means against force applied at said span and adapted to release said non-resilient elongated member under an oppositely directed force, a tensioner means including a fixed cylinder and piston therein, the other end of said non-resilient elongated member being secured to said piston for movement therewith, and a source of pressure connected to said cylinder for urging said piston in a direction to prestress said resilient elongated member.

References Cited in the file of this patent

UNITED STATES PATENTS

| | | |
|---|---|---|
| 1,555,379 | Moody | Sept. 29, 1925 |
| 2,523,314 | Maxson et al. | Sept. 26, 1950 |
| 2,672,306 | Doolittle et al. | Mar. 16, 1954 |

FOREIGN PATENTS

| | | |
|---|---|---|
| 190,547 | Austria | July 10, 1957 |